Aug. 3, 1954  M. K. TAYLOR  2,685,611

POSITIONAL DATA TRANSMITTING SYSTEM

Filed Dec. 13, 1951  4 Sheets-Sheet 1

INVENTOR
Maurice Kenyon Taylor
BY
Cushman, Darby & Cushman
ATTORNEYS

Aug. 3, 1954     M. K. TAYLOR     2,685,611
POSITIONAL DATA TRANSMITTING SYSTEM
Filed Dec. 13, 1951     4 Sheets-Sheet 2

Aug. 3, 1954  M. K. TAYLOR  2,685,611
POSITIONAL DATA TRANSMITTING SYSTEM
Filed Dec. 13, 1951  4 Sheets-Sheet 3
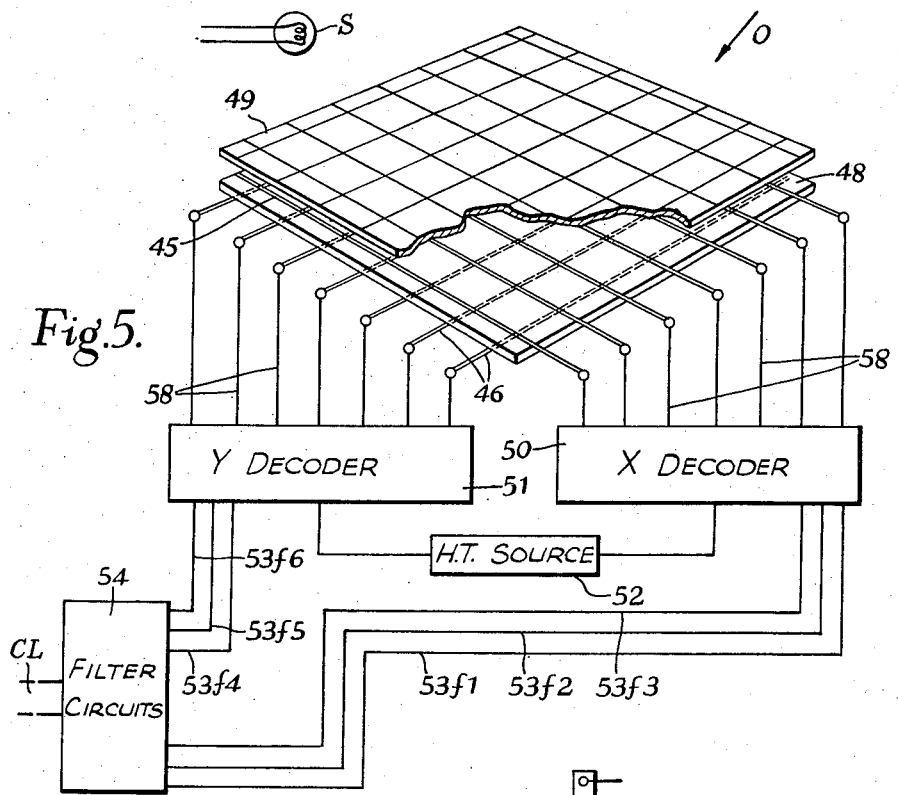
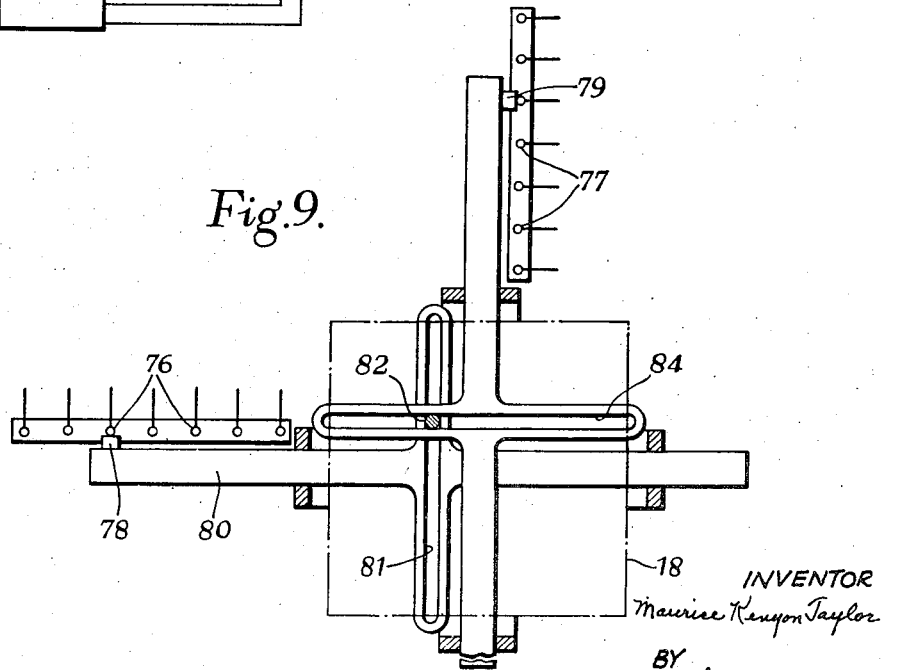
INVENTOR
Maurice Kenyon Taylor
BY
Cushman, Darby & Cushman
ATTORNEYS Aug. 3, 1954 M. K. TAYLOR 2,685,611
POSITIONAL DATA TRANSMITTING SYSTEM
Filed Dec. 13, 1951 4 Sheets-Sheet 4
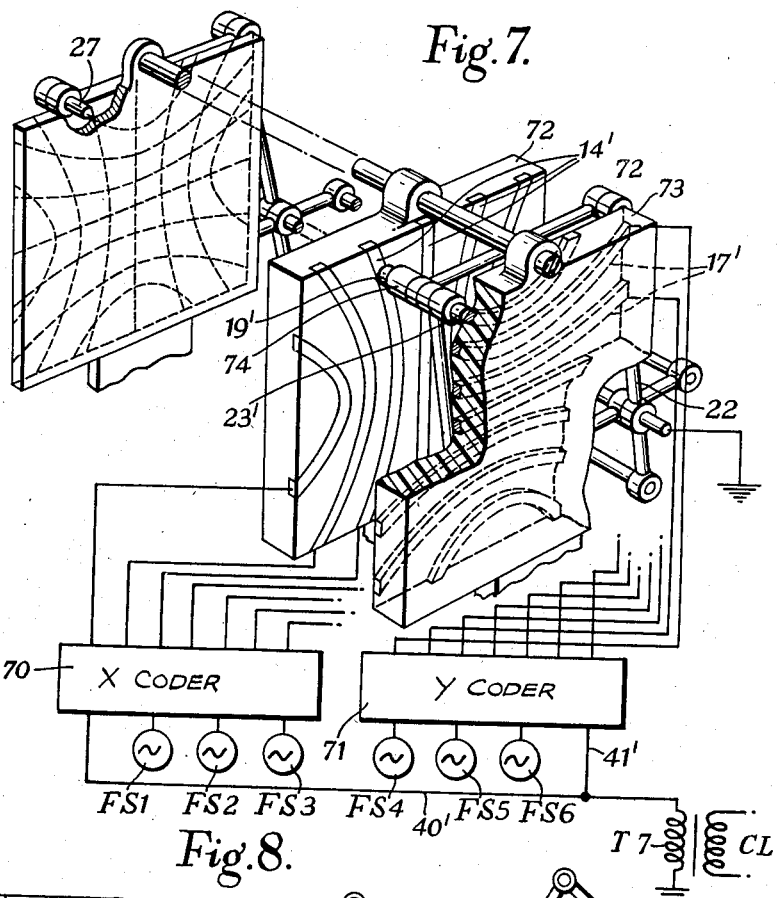
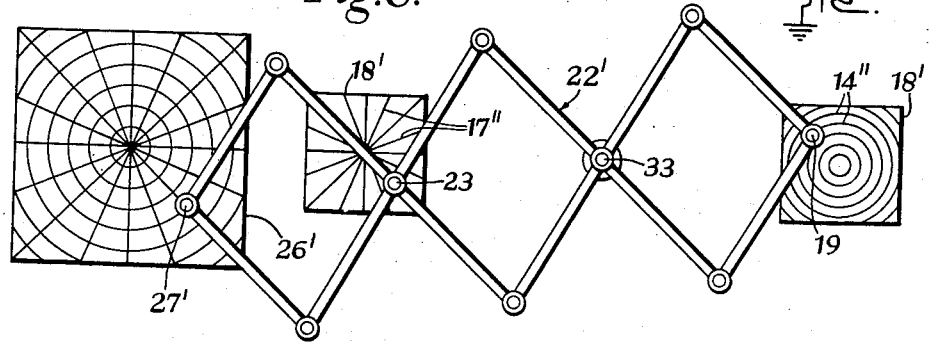
INVENTOR
Maurice Kenyon Taylor
BY
Cushman, Darby & Cushman
ATTORNEYS Patented Aug. 3, 1954

2,685,611

UNITED STATES PATENT OFFICE 2,685,611

POSITIONAL DATA TRANSMITTING SYSTEM

Maurice Kenyon Taylor, Mount Dennis, Toronto, Canada, assignor to Ferranti Limited, Hollinwood, England, a British company Application December 13, 1951, Serial No. 261,523

Claims priority, application Great Britain December 15, 1950

11 Claims. (Cl. 178—19)

This invention relates to positional data transmitting systems and specifically to systems for transmitting to some distant place data indicating the position of an object with respect to a predetermined reference system comprising two intersecting families of curves. The term "curve" is to be understood hereinafter to include, where appropriate, the special case of a straight line. In addition, it is to be understood that the curves of a family of curves need not be co-planar.

Such a reference system may, for example, be a map grid or other form of rectangular co-ordinates, each family of curves in this instance comprising a set of parallel straight lines and the various points of intersection lying in a common plane. In another form the reference system may consist of representations of latitude and longitude, the curves, in this instance, being circles disposed upon the surface of a common sphere and on which surface the various points of intersection will lie. In yet another form the reference system may be one of polar co-ordinates, one family of curves being co-planar concentric circles and the other being co-planar straight lines passing through a common origin lying at the centre of such circles. The invention may also be used in conjunction with one of the well known kinds of hyperbolic navigational systems, each family of curves then being a set of confocal hyperbolas.

An object of the present invention is to provide an improved positional data transmitting system for the purpose stated.

Another object of the present invention is to provide a system for transmitting data indicative of the position of an object with respect to a predetermined reference system of two intersecting families of curves and comprising two sets of transmitter electrical conductors, such conductors being shaped and positioned to represent respectively the afoersaid two families of curves and each conductor being insulated from all other conductors, for each of said transmitter conductors a corresponding receiver conductor, contact means for effecting at any given moment electrical connection with one transmitter conductor in each of said sets of transmitter conductors, which connected conductors are representative of those two of said curves whose intersection defines the position of said object at that moment, coding means for deriving, under the control of each of said connected transmitter conductors, a signal representative of that conductor, decoding means for causing each of said signals to energize the particular receiver conductor corresponding to the transmitter conductor which is represented by that signal and reproducing means whereby the energization of said two receiver conductors results in the indication of the position of said object.

The two sets of conductors above referred to may be so located relative to each other as to form a grid-like assembly of conductors. Alternatively, such sets of conductors may be separated from each other. The aforesaid contact means may be arranged to connect the said two conductors in series or in parallel thereby completing an electric circuit of which each of said two conductors forms a part, or two electric circuits of which said conductors respectively form parts, as the case may be.

In order that the various objects and features of the invention may be more readily understood embodiments of the invention will now be described in greater detail and with reference to the accompanying drawings wherein:

Fig. 5 is a perspective view of one form of receiver device.

Figs. 7, 8 and 9 are schematic diagrams illustrating alternative forms of transmitter device.

Figure 1:
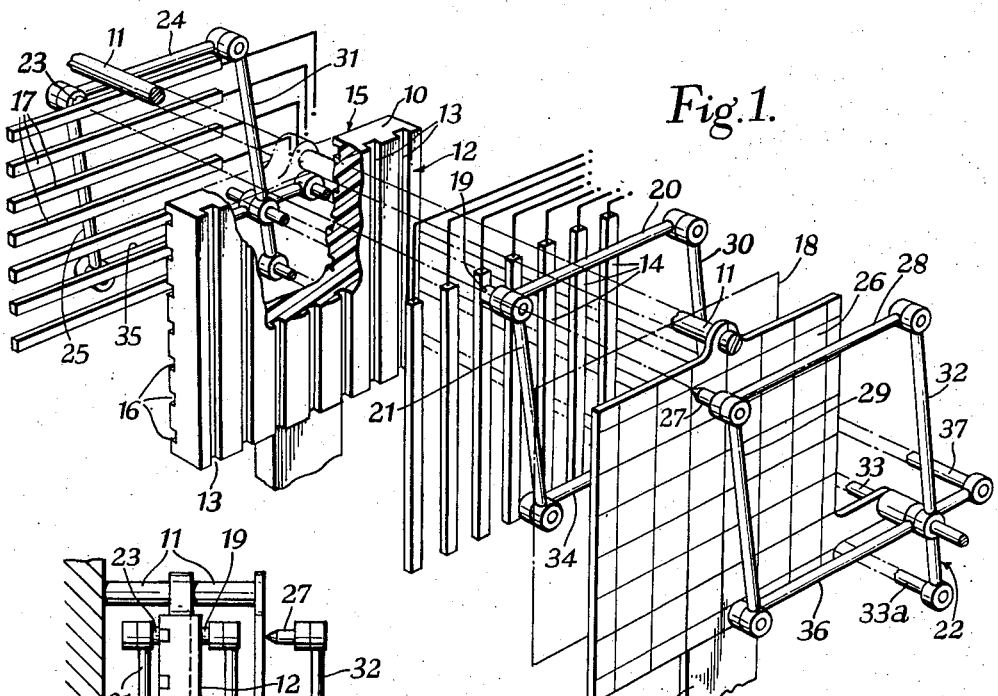
Fig. 1 is an exploded perspective view of one form of transmitter device.
Figure 2:
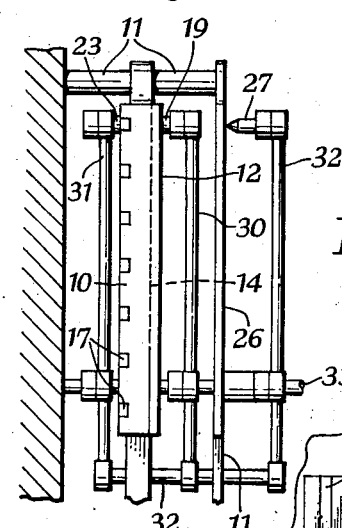
Figs. 2 and 3 are side and end elevational views of the device of Fig. 1.
Figure 3:
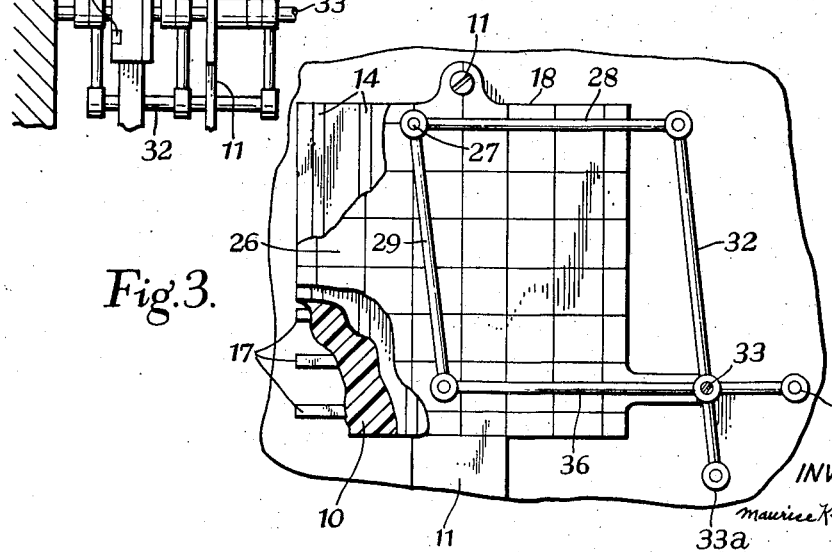

The invention will first be described, by way of example, for use in the simpler case where the predetermined reference system is a plain rectangular grid and where, accordingly, the data to be transmitted are the rectangular co-ordinates $x$ and $y$ of the object with respect to such system. In carrying out the invention according to this form thereof, and as shown in Figs. 1, 2 and 3, the transmitted device comprises a rectangular sheet of insulating material 10 suitably mounted upon stationary support members 11.

In one face 12 of this sheet, partially embedded in vertical grooves 13, are disposed a set of straight electrical conductor rods 14 normal to the X axis. These conductors will hereinafter be referred to as the X conductors since each one represents a constant value of X for different values of Y. In the other face 15 of the sheet 10 and partially embedded in similar but horizontal grooves 16 are disposed another set of straight conductor rods 17 normal to the Y axis, i. e. at right angles to the X conductors 14. These further conductor rods will, for similar reasons, hereinafter be referred to as the Y conductors. Each conductor 14 or 17 extends the full width or length, as the case may be, of the rectangular field 18 of the reference system and is sufficiently spaced from its neighboring conductors on the same side of the sheet 10 as to be reliably insulated from them. The sheet 10 is of sufficient thickness to insulate all the conductors 14 on one face from all the conductors 17 on the other face. Although with such a construction the two sets of conductors 14 and 17 are not actually in the same plane they nevertheless form effectively a grid-like assembly of conductors and represent respectively the two families of curves that constitute the reference system. This illustrated example is one where the term "curve" has the special meaning of a straight line.

The various vertical or X conductors 14 co-operate with a single movable contact 19 which is carried by arms 20, 21 forming part of a pantograph lever system 22 permitting displacement of the contact 19 to any point within the rectangular field 18 so as to make electrical connection with the exposed surface of any chosen one of such X conductors 14 at any given position along its length. The horizontal Y conductors 17 similarly co-operate with a further movable contact 23 which is carried by lever arms 24, 25 also forming part of the pantograph lever system 22. This contact 23 is capable of movement to any point within the same rectangular field 18 so as to make electrical connection with the exposed surface of any chosen one of the Y conductors 17 at any given position along its length. Disposed parallel to the sheet 10 and conductors 14, 17 is an engraved chart 26 defining the field 18 over which the two contacts 19 and 23 are movable. This chart 26 is conveniently mounted upon the same stationary support members 11 and is engraved according to any desired pattern, e. g. with a series of horizontal and vertical co-ordinate lines corresponding to the X and Y conductors 14 and 17. Alternatively or additionally it may be provided with a map contour or other design. This chart, which is mounted in front of the sheet 10 for use by an operator, co-operates with a movable stylus point 27 which is carried by arms 28, 29 forming a further part of the pantograph lever system 22.

The arms 20, 24 and 28 of the pantograph lever system 22 are each pivotally connected respectively to further arms 30, 31 and 32 freely pivoted upon a fixed spindle 33 lying at right angles to and to one side of the sheet 10 and chart 26. The free ends of extensions of these arms 30, 31 and 32 are rigidly interconnected by link 33a. The arms 21, 25 and 29 are similarly connected respectively to further arms 34, 35 and 36 which are also freely pivoted upon the spindle 33 and again each have their free ends rigidly interconnected by a link 37. The resultant construction provides a pantograph lever system 22 in which any movement imparted to the stylus point 27 to place it in any required position within the field 18 will cause equivalent movement of both movable contacts 19 and 23 to maintain them in alignment with the stylus and thus to make contact with the particular X and Y conductors 14 and 17 which are appropriate to the co-ordinates of the selected point.

The two contacts 19 and 23 are electrically interconnected through the lever system 22 so that the selected X and Y conductors which are respectively engaged by the contacts at any time, are connected electrically in series by such contacts.

The engagement of the contacts 19 and 23 with any two selected conductors 14, 17 of the X and Y sets controls the derivation of appropriate signals representative of the particular conductors in use for transmission to a receiver device and the coding means by which such signals may be derived is illustrated and described in detail in copending patent application No. 265,460, now U. S. Patent No. 2,672,605, dated March 16, 1954. On example of such coding means will now be described with reference to Fig. 4 in which, for simplicity, it will be assumed that there are only 7 rods 14 in the set of X conductors and only 7 rods 17 in the set of Y conductors. In practice, of course, there will be many more conductors in each set to obtain adequate resolution.

Figure 4:
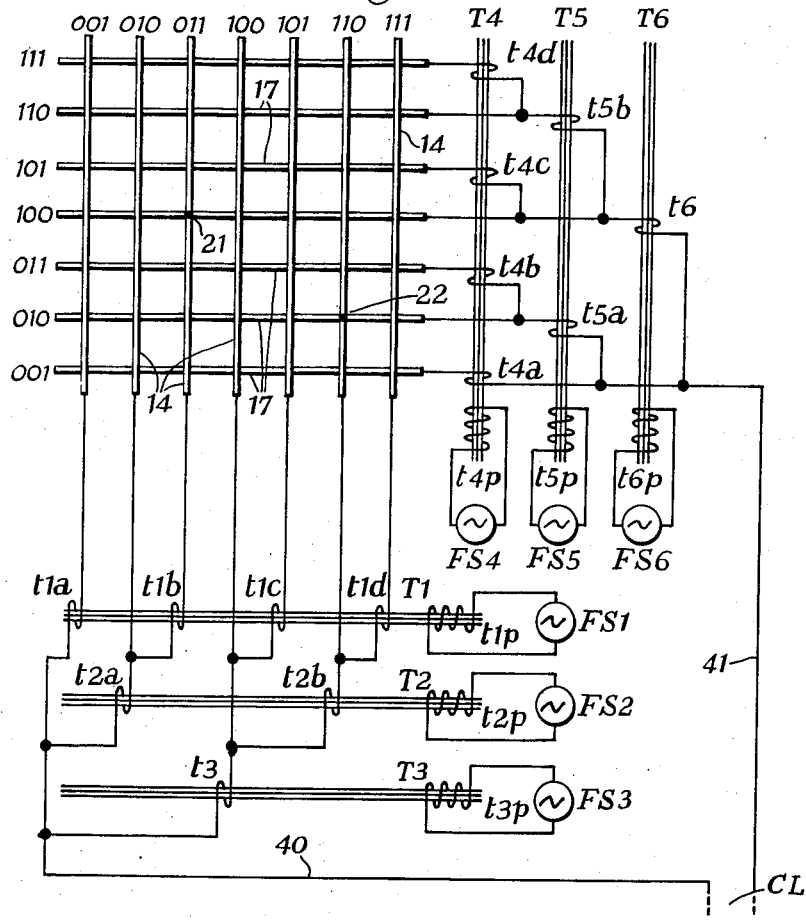
Fig. 4 is a schematic circuit diagram illustrating the coding arrangements at the transmitter.

Referring now to Fig. 4, the various X conductors 14 are associated with a series of transformers T1, T2, T3 representing respectively the successively ascending powers of the binary scale, $2^0$, $2^1$ and $2^2$. The transformer T1 (corresponding to binary power $2^0$) has four secondary windings $t1a$, $t1b$, $t1c$ and $t1d$, the transformer T2 (corresponding to binary power $2^1$) has two secondary windings $t2a$ and $t2b$ and the third transformer T3 (corresponding to binary power $2^2$) has only one secondary winding $t3$. The various X conductors are, for the purpose of identification, serially numbered in the binary scale as 001, 010 ... 111 (i. e. 1 to 7 in the decimal scale). Each conductor 14 is connected to a common lead 40 by such of the secondary windings of the transformers T1, T2 and T3, connected in series, as associate that particular conductor with the transformers appropriate to the binary identification number of the conductor. Thus X conductor 001 is connected to the common lead 40 through only winding $t1a$ of transformer T1 (corresponding to $2^0$); conductor 010 is connected to lead 40 through only winding $t2a$ of transformer T2 (corresponding to $2^1$), conductor 011 is connected to lead 40 through winding $t1b$ of transformer T1, ($2^0$) thence through winding $t2a$ of transformer T2 ($2^1$) and so on, conductor 111 being connected to the common lead by way of a secondary winding of each transformer, namely, winding $t1d$ of transformer T1, winding $t2b$ of transformer T2 and winding $t3$ of transformer T3.

Each transformer T1, T2 and T3 has a primary winding, $t1p$, $t2p$ and $t3p$ respectively. Each primary winding is separately and continuously energised from an oscillator or like A. C. frequency sources FS1, FS2 and FS3. The respective frequencies provided by the sources FS1, FS2 and FS3 are distinctively different from one another and should not, for preference, bear any harmonic relationship to one another. Thus transformer T1 may be energised at a frequency $f1$ of, say, 1,000 C. P. S., transformer T2 at frequency $f2$ of, say, 1200 C. P. S. and transformer T3 at frequency $f3$ of, say, 1400 C. P. S.

Similar arrangements are provided for the Y conductors 17 by means of three further transformers T4, T5 and T6 and common lead 41. Transformer T4 is provided with four secondary windings $t4a$, $t4b$, $t4c$ and $t4d$ which are connected respectively to Y conductors numbered 001, 011, 101 and 111, transformer T5 is provided with two secondary windings $t5a$, $t5b$ connected respectively to Y conductors 010 and 110 and also to windings $t4b$ and $t4d$ of transformer T4 while transformer T6 has one secondary winding t6 connected directly to Y conductor 100 and also to winding t5b of transformer T5. Each Y conductor is thus connected through one or more secondary windings to the second common lead 41.

The three Y transformers T4, T5, and T6 are provided respectively with primary windings t4p, t5p and t6p, which are energized respectively by three further oscillators or like A. C. frequency sources FS4, FS5 and FS6. The frequencies of operation of these sources are again arranged to be different from one another and from those of the sources FS1, FS2 and FS3. Thus the frequency, f4, of source FS4 may be 1700 C. P. S., that, f5, of source FS5, 1900 C. P. S. and that, f6, of source FS6, 2100 C. P. S.

The common leads 40, 41 are connected to suitable receiving equipment by way of some convenient communication link CL which may be a cable or like conductor or a carrier wave or radio communication link.

With the arrangement described when any one of the X conductors 14 is electrically connected to any one of the Y conductors 17 through the movable contacts 19 and 23, signals are delivered to the communication link CL, comprising a plurality of separate frequencies representative, in the particular example given, of the binary number allocation of the two X and Y conductors concerned. For example, if X conductor 011 is connected at point z1 to Y conductor 100, the frequencies transmitted over the communication link CL will be those of f1, f2 and f6 C. P. S. If, on the other hand, X conductor 110 is connected at point z2 to Y conductor 010, the frequencies transmitted over link CL will be those of f2, f3 and f5 C. P. S. and so on.

Fig. 5 illustrates schematically one form of suitable receiving means as described in greater detail in copending patent application Ser. No. 271,488. Such receiving means comprises a grid-like arrangement of two conductor sets 45 and 46 resembling respectively those of the X and Y sets of conductors 14 and 17 in the transmitter device of Figs. 1, 2 and 3. In this instance, however, the two sets of conductors are disposed one on each side of a sheet of electro-responsive material 48 so as to be effectively separated from one another by the thickness dimension of the sheet material. The electro-responsive material 48 may, for example, be a sheet of white waxed paper. The conductors 45, 46 are wires of fine enough gauge to allow free observation of the sheet material 48, preferably through a transparent chart 49 which is conveniently engraved in accordance with the marking of the chart 26 of the transmitter device of Figs. 1–3. Each of the X, Y, receiver conductors 45, 46 corresponds to an individual one of the related X, Y transmitter conductors 14, 17 and occupies a similar position in the grid so formed.

The marking of the sheet of electro-responsive material 48 at the receiver is effected by applying a suitably high potential between the appropriate selected one of the X conductors 45 and the appropriate selected one of the Y conductors 46 which correspond respectively with the connected X and Y conductors of the transmitter device. A spark discharge is thereby caused to take place at the point of intersection of such selected receiver conductors, such spark passing through the intervening waxed paper or other sheet and providing a corresponding visible marking.

The selective energisation of the requisite receiver conductors 45, 46 is effected by an X decoder device 50 and a Y decoder device 51 which control the application of potential from a high-tension source 52 under the control of separate and different frequency signals on leads 53f1, 53f2, 53f3, 53f4, 53f5 and 53f6 derived from a filter network 54 whose input is supplied from the communication link CL.

The decoding means for causing the received signal to provide selective energisation of the requisite X and Y grid wires of the receiver indicating device are described in detail in copending patent application Ser. No. 271,488. The filter network 54 may comprise a plurality of electrical filters for separating the signals of each of the six different frequencies into the six individual frequency channels appropriate thereto. The three channels 53f1, 53f2, 53f3 individual to the frequencies f1, f2 and f3 C. P. S. and hence appropriate to the X co-ordinates of the transmitted position are applied to the X decoder device 50 while the similarly separated frequency channels 53f4, 53f5 and 53f6 individual to the frequencies f4, f5 and f6 and hence appropriate to the Y co-ordinates of the transmitted position are applied to the Y decoder device 51.

Figure 6:
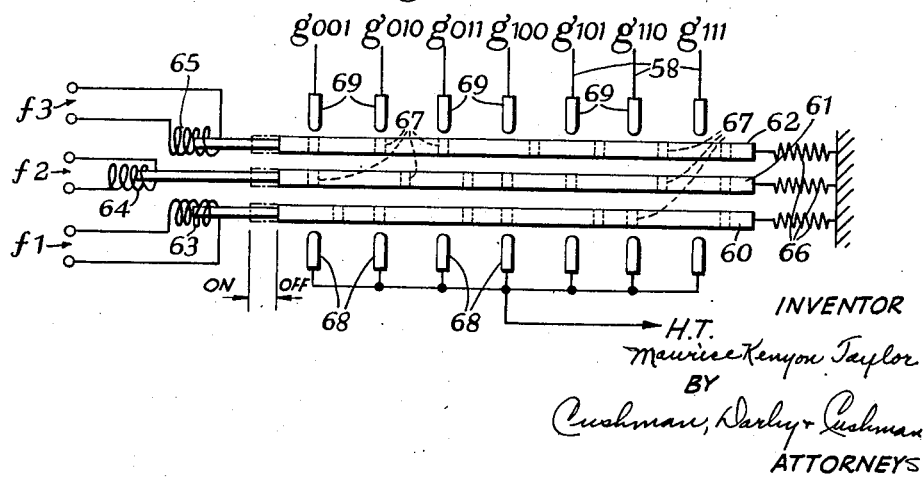
Fig. 6 is a schematic view illustrating one form of receiver decoding device.

The form of the X decoder device may be as shown in Fig. 6. The construction shown comprises three strips 60, 61, 62 of suitable insulating material, such as mica. The first strip 60 is arranged to correspond with the first frequency, f1, i. e. with the transformer T1 of the transmitter device, the second strip 61 with the second frequency f2 or transformer T2 of the transmitter and the third strip 62 with the third frequency f3 or transformer T3 of the transmitter. Each strip is arranged for longitudinal movement from an "off" position, as indicated in full lines and towards which the strips are each urged by gravity or by springs 66, and an "on" position, as indicated in chain-dotted lines, by energisation of its individual electromagnetic operating solenoid or the like 63, 64 or 65. Each of the solenoids 63, 64 and 65 is selectively energised by the received signals of frequencies f1, f2 and f3 respectively after passage of the latter through appropriate amplifying and, if necessary, rectifying means. For example, the first solenoid 63 is energised to move the strip 60 from the full line to the chain-dotted line position upon the occurrence of a signal at frequency f2 in the output from the filter network 54. Similarly the other solenoids 64 and 65 are energised in response to outputs at the other frequencies f2 and f3.

Each mica or other strip has seven holes 67 punched therein at appropriate positions along its length, and the three strips are superimposed on each other so that the second strip 61 is sandwiched between the other two strips 60 and 62.

The assembled triple layer of strips 60, 61 and 62 is interposed between the co-operating electrodes 68 and 69 of a row of seven separate spark-gaps designated g001, g010, g011 . . . g111 (in the binary scale). The various electrodes 68 on one side of the strip assembly are electrically connected and joined to one terminal of the high-tension source 52 while the opposite electrodes 69 are connected individually over leads 58 to that one of the various X receiver conductors 45 which has the binary identification number corresponding to that of the spark gap.

Each of the seven holes 67 in each strip 60, 61 or 62 is located adjacent to one of the spark gaps between the opposing rows of electrodes 68, 69, the exact locations of the holes being such that when all three strips are in the "off" position, as shown, the holes 67 are not aligned in any of the seven separate gaps g001 . . . 0111 with the result that each spark gap is effectively closed by at least one mica strip. When the first strip 60 alone is moved to the "on" position due to energisation of the solenoid 63 by presence of a received signal of frequency $f1$, only those holes 67 adjacent the gap g001 become aligned and thus open this gap to allow passage of a spark discharge across the gap, with a corresponding energisation of the X receiver conductor 45 having the identification 001. When the second strip 61 alone is moved to the "on" position only those holes 67 adjacent the gap g010 will become aligned to allow a spark discharge for energising the X receiver conductor having the identification 010. Similarly when both first and second strips 60, 61 are moved to the "on" position by the simultaneous presence of received signals of frequencies $f1$ and $f2$, the holes 67 adjacent gap g011 will be the only ones in alignment and so on.

The Y decoder device 51 is of precisely similar construction for energisation of its solenoid or like strip-operating means by received signals of frequencies $f4$, $f5$ and $f6$.

In the operation of the system described, the stylus 27 will first be assumed to be located outside the field 18 of the reference system. In consequence neither of the movable contacts 19, 23 will be in engagement with any of the conductors 14, 17 and all of the secondary windings of transformers T1—T6 will be an open circuit and no signal will be delivered to the communication link CL. At the receiver, none of the solenoids of either decoder device 50, 51 will be energised and the movable strips of each will all be in the "off" position to close all of the spark gaps and thus ensure that no receiver conductor is energised.

If now the stylus point 27 is moved to a position within the field 18 in order to represent the position of some object with respect to the system, the two movable contacts 19 and 23 will each be moved correspondingly to engage respectively with the particular conductor bars 14 and 17 which represent the co-ordinates of the position indicated by the stylus point. In this way a circuit will be completed between the common leads 40, 41 (and hence between the ends of the communication link CL) by way of such conductors and the appropriate secondary windings of the transformers T1—T3 and T4—T6 which represent the binary identification numbers of those conductors and will thus cause delivery to the communication link CL of the requisite frequency signals which are indicative of the contacted conductor rods.

At the receiver, the filter networks 54 separate out the transmitted frequencies into their individual channels 53f1 . . . 53f6 to effect energisation of the associated solenoids in the X and Y decoder devices 50, 51 and thus to cause displacement to the "on" position of those strips whose movement is necessary to open the particular spark-gaps which are associated with the receiver conductor rods which represent the co-ordinates of the object. A circuit is thus completed from one pole of the H. T. source 52 by way of the opened X spark gap, the corresponding X receiver conductor, the intermediate spark gap through the waxed paper 48, the appropriate Y receiver conductor and the opened Y spark gap to the opposite pole of the H. T. source.

The passage of the spark through the waxed paper at the intersection of the energised X and Y conductors causes melting of the wax over a small area around the discharge point. The waxed paper sheet 48 is viewed by an observer from the direction $o$ under the illumination of a light source $s$ and the increased translucence of the melted wax area gives to the observer the appearance on the viewed illuminated side of a darker spot on the sheet of otherwise opaque light reflecting paper. The position of this spot, as determined by the co-ordinates engraved on the transparent chart 49 through which it is observed, corresponds to the position of the stylus point 27 and so indicates the position of the object with respect to the rectangular grid of the reference system at the transmitter device.

Although one of the sets of the receiver conductor wires is located between the observer and the waxed paper sheet 48, the choice of a suitable fine gauge for such wires permits a sufficiently clear view of the spot to be obtained.

The above described embodiment utilising rectangular co-ordinates is clearly only one of many possible constructions and is given by way of descriptive illustration only. The arrangements described may be extensively modified within the scope of the invention.

Fig. 7 illustrates one possible modification in which instead of connecting the two X and Y transmitter conductors 14', 17' in series at the intersection to define the position of the object, such conductors may be connected in parallel. Referring to Fig. 7 the two movable contacts 19' and 23' co-ordinated with the stylus point 27 as before by mounting upon a pantograph lever system 22, are each connected directly to earth while the two common output leads 40', 41' from the X and Y coding systems 70, 71, which comprise multiple transformers as already described in connection with Fig. 4, are connected together and taken to earth through the primary of a transformer T7 whose secondary winding is connected to the communication link CL. The connections at the receiver may be similar to those already described.

With such a modified arrangement the engagement of either X or Y movable contact 19' or 23' with one of the associated conductors 14' or 17' completes the appropriate secondary circuit or circuits of the X or Y transformers in the coding systems 70, 71, as the case may be, the path from earth being completed back to earth by way of the movable contact 19' or 23' concerned, the particular X or Y conductor 14' or 17' engaged by that contact, the secondary windings appropriate to that conductor on one or more of the transformers within the coding systems 70, 71, the appropriate common output lead 40' or 41' and the primary of the output transformer T7. This arrangement has the advantage that a signal is transmitted to the receiver even though only one of the two movable contacts 19', 23' is in engagement with a conductor.

This modified embodiment of Fig. 7 also illustrates a reference system of hyperbolic form and of the type well known in connection with radio navigation. The conductors 14', 17' are, in this case, bent to the shape of the various hyperbolas those in each set being, of course, confocal. It will be appreciated that, in order to determine the position of an object uniquely, the reference system must be such that no curve of either family intersects a curve of the other family at more than one point.

Fig. 7 also illustrates an alternative mounting arrangement for the X and Y conductors. In this embodiment the X conductors 14' are carried upon one sheet of insulating material 72 and the Y conductors 17' upon a separate sheet of insulating material 73 with the exposed contact surfaces of the two sets of conductors facing each other. This enables the movable contacts 19', 23' to be combined as a single, double-ended, structure 74 carried by one pair of arms of the pantograph lever system 22.

Fig. 8 illustrates a further modification in which the two sets of X and Y conductors 14" and 17" are located quite separately from each other and are no longer located relatively to each other so as to form a grid-like assembly. To permit this arrangement, in which the X and Y conductor sets are mounted in a common plane, the pantograph lever system 22' is suitably modified in its linkage arrangements to provide the requisite conjoint movement of the two movable contacts 19, 23 with respect to the sets of conductors. In this embodiment also, the engraved chart 26' against which the stylus point 27' is moved is of different size from that of the field areas 18' of the movable contacts 19, 23, the requisite alteration of scale being effected by suitable modification of the mechanical linkages of the pantograph lever system.

Fig. 8 also illustrates a reference system of polar co-ordinates with one, the X, family of curves as co-planar concentric circular arcs and the other, the Y, family of curves as coplanar straight lines passing through a common origin which is effectively coincident with the centres of the circular arcs of the X family.

Fig. 9 shows yet a further modification in which, although the reference system is effectively that of a system of rectangular co-ordinates, the various X and Y conductors comprise only two series of contact studs 76, 77 engaged respectively by movable wipers 78, 79. The wiper 78 is carried upon a longitudinally slidable bar 80 provided at one end with a transversely disposed slot 81 within which is received a pin 82 which itself may form the movable stylus point 27 or which, alternatively, may be linked to the latter by way of a pantograph lever system. The other wiper 79 is similarly carried upon a second longitudinally slidable bar 83 also having a slot 84 disposed at right angles to the slot 81. This second slot 84 likewise receives the pin 82. Movement of the pin 82 to any point within the field 18 will produce movement of each wiper 78, 79 to appropriate contact studs to define the X and Y co-ordinates of the pin position.

Where the reference system is that of rectangular co-ordinates, as described in connection with Figs. 1–6 or Fig. 9, the stylus point 27 may be constrained to follow a circular arc centered on the origin of the system. The X and Y co-ordinates of any position of the stylus are then proportional respectively to the cosine and sine of the angle between the radius vector of the stylus and the X axis. An equivalent of a sine/cosine potentiometer is thus provided. Any convenient values may be chosen for the frequencies employed to characterise the various X and Y conductors. In practice it is advisable to ensure that none of the frequencies have a harmonic relationship since if, for example, $f2$ equals $3 \times f1$, the $f2$ solenoid at the receiver may be incorrectly actuated by the third harmonic of an $f1$ signal. Typical frequency values are the six frequencies already given but the frequencies used may clearly be of any suitable value according to the number of channels required and the type of communication link employed. Obviously the actual frequencies $f1 \ldots fx$ at the receiver need not be the same as those which are related thereto at the transmitter. They may be widely different, for example, as a result of frequency-changing during transmission over the communication link CL.

In some cases it may be undesirable to allow the movable contact 19 or 23 to bridge adjacent transmitter conductors when passing from one to another in which case the diameter of the operative surface of the contact must be less than the width of insulation between conductors. Where such bridging is unobjectionable the interconductor insulation may be reduced to a thin film thereby increasing the number of conductors capable of being accommodated in a given size of field 18 and so increasing the resolving power of the arrangement.

I claim:

1. A system for transmitting date indicative of the position of an object with respect to a predetermined reference system of two intersecting families of curves, which comprises two sets of transmitter electrical conductors, such conductors being shaped and positioned to represent respectively said two families of curves and each conductor being insulated from all the other conductors, contact means for effecting electrical connection with any selected one transmitter conductor in each of said sets of conductors, which selected conductors are representative of those two of said curves whose intersection defines the position of the object at that moment, coding means for deriving, under the control of each of said connected transmitter conductors, a signal representative of that conductor, a receiver comprising first and second sets of receiver conductors, the individual conductors in each set corresponding to the conductors in the respective transmitting sets, decoding means for causing each of said signals to energise the receiver conductor corresponding to the transmitter conductor which is represented by that signal and reproducing means comprising an electro-responsive sheet arranged parallel to said first and second sets of receiver conductors and adapted to respond visibly at a point whose co-ordinates correspond to those of the individual receiver conductors one in each set which are energized at any instant by the said decoding means.

2. A system for transmitting data indicative of the position of an object with respect to a predetermined reference system of two intersecting families of curves, which comprises a transmitter having a first set of electrical conductors shaped and positioned to represent one of said two families of curves, a second set of electrical conductors shaped and positioned to represent the other of said two families of curves, each of said conductors being insulated from all other conductors, movable contact means for establishing electrical connection with that transmitter conductor in said first set and that transmitter conductor in said second set which are representative of those two of said curves whose intersection defines the position of an object at any moment, coding means controlled by said established connections between said contact means and said conductors of said first and second sets for deriving signals representing respectively the contacted conductors of said first and second sets, a receiver comprising a first set of electrical conductors one for each of and corresponding to the conductors of said first set of transmitter conductors, a second set of electrical conductors one for each of and corresponding to said conductors of said second set of transmitter conductors, decoding means for causing signals to energise selected conductors of each of said first and said second set of receiver conductors which correspond to the contacted transmitter conductors and reproducing means comprising a sheet of electro-responsive material arranged to respond visibly at a point corresponding to the intersection of said selected receiver conductors whereby the energisation of said selected receiver conductors provides an indication of the position of said object at any moment.

3. A system according to claim 2 in which said first and second sets of transmitter conductors are disposed respectively on opposite sides of an insulating sheet and which includes separate contact means for each of said conductor sets, said contact means being mechanically interconnected for conjoint movement.

4. A system according to claim 2 in which said first and second sets of transmitter conductors are mounted upon opposing parallel surfaces of separate insulating members and in which said contact means is constituted by a single element with double contact making surfaces operative between said opposing surfaces.

5. A system according to claim 2 in which said first and second sets of transmitter conductors are disposed in coplanar and spatially separated relationship with individually movable contact means for each of said sets of transmitter conductors and which includes a stationary chart bearing a representation of said reference system, a stylus member movable with respect to said stationary chart for indicating an object position with respect to said reference system and mechanical linkage means interconnecting said individual movable contact means and said stylus member for conjoint movement.

6. A system according to claim 2 which includes circuit connections by which said movable contact means connects the selected conductor of said first set of transmitter conductors in series with the selected conductor of said second set of transmitter conductors to complete a circuit of which each conductor forms a part.

7. A system according to claim 2 which includes circuit connections by which said movable contact means connects said selected conductor of said first and second sets of transmitter conductors in parallel with one another to complete two electric circuits of which said conductors respectively form parts.

8. A system according to claim 2 wherein said first and second sets of transmitter conductors define a reference system of rectangular co-ordinates and which includes means for constraining said contact means to follow a circular arc of movement centred on the origin of said reference system.

9. A system according to claim 2 wherein said receiver comprises means for positioning said first and second sets of receiver conductors upon opposite sides of said electro-responsive sheet in correct relationship to define said reference system and a source of electric potential, said decoding means serving to connect said source of potential between a selected conductor of said first set and a selected conductor of said second set to produce a responsive marking on said electro-responsive sheet at the point of intersection of said selected conductors.

10. A system according to claim 2 wherein said receiver comprises a sheet of waxed paper, means for positioning said first and second sets of receiver conductors upon opposite sides of said sheet in correct relationship to define said reference system, a source of electric potential and means for illuminating one side of said sheet, said decoding means serving to connect said source of potential between a selected conductor of said first set and a selected conductor of said second set to produce a spark discharge through said sheet at the point of intersection of said selected conductors for melting said wax to alter the coefficient of light reflection of said sheet at said point.

11. A system according to claim 2 wherein the electro-responsive material is arranged between the first and second sets of receiver conductors, and is visibly responsive by the burning effect produced by an electrical discharge between said selected receiver conductors of the first and second sets.

References Cited in the file of this patent

UNITED STATES PATENTS

| Number | Name | Date |
|---|---|---|
| 1,283,147 | Ghio | Oct. 29, 1918 |
| 1,383,750 | Parker et al. | July 5, 1921 |
| 1,725,533 | Lee | Aug. 20, 1929 |
| 1,786,805 | Wensley | Dec. 30, 1930 |
| 1,965,206 | Tarbox | July 3, 1934 |
| 2,094,068 | Harrison | Sept. 28, 1937 |
| 2,182,152 | Hullegard | Dec. 5, 1939 |
| 2,450,516 | Kinkead et al. | Oct. 5, 1948 |